US009755684B2

(12) United States Patent
Yoo et al.

(10) Patent No.: US 9,755,684 B2
(45) Date of Patent: Sep. 5, 2017

(54) ELECTRONIC DEVICE INCLUDING ANTENNA DEVICE

(71) Applicant: Samsung Electronics Co., Ltd., Gyeonggi-do (KR)

(72) Inventors: Chae-Up Yoo, Seoul (KR); Jung-Kyu Lee, Gyeonggi-do (KR); Byung-Man Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/055,096

(22) Filed: Feb. 26, 2016

(65) Prior Publication Data

US 2016/0254832 A1 Sep. 1, 2016

(30) Foreign Application Priority Data

Feb. 26, 2015 (KR) ........................ 10-2015-0027594

(51) Int. Cl.
*H04M 1/00* (2006.01)
*H04B 1/3827* (2015.01)
(Continued)

(52) U.S. Cl.
CPC ........... *H04B 1/3838* (2013.01); *H01Q 1/243* (2013.01); *H01Q 5/35* (2015.01); *H01Q 5/378* (2015.01); *H01Q 9/42* (2013.01)

(58) Field of Classification Search
CPC ............ H04M 1/0277; H05K 13/0023; H05K 5/0017; H05K 5/0217; H05K 5/03; H05K 5/04; H05K 7/1417; H05K 9/0015
(Continued)

(56) References Cited

U.S. PATENT DOCUMENTS

2010/0271270 A1* 10/2010 Sung ................. B29C 45/14065
343/702
2012/0112969 A1 5/2012 Caballero et al.
(Continued)

FOREIGN PATENT DOCUMENTS

EP 2 629 361 8/2013
EP 2 677 600 12/2013

OTHER PUBLICATIONS

International Search Report dated May 31, 2016 issued in counterpart application No. PCT/KR2016/001707, 8 pages.
(Continued)

*Primary Examiner* — Tu X Nguyen
(74) *Attorney, Agent, or Firm* — The Farrell Law Firm, P.C.

(57) ABSTRACT

An electronic device including an antenna device is provided. The electronic device includes a case member, a frame disposed around a periphery of one surface of the case member, forming sidewalls, and an antenna device for transmitting and receiving wireless signals. The antenna device includes a first radiation conductor forming a first part of the frame, a second radiation conductor disposed in a vicinity of the first radiation conductor, forming a second part of the frame, a third radiation conductor provided on the case member and connected to a first power supply of the electronic device, together with the first radiation conductor, and a fourth radiation conductor provided on the case member and connected to a ground of the electronic device. At least a part of the fourth radiation conductor is disposed in a vicinity of the second radiation conductor.

28 Claims, 11 Drawing Sheets

(51) Int. Cl.
    *H01Q 1/24*     (2006.01)
    *H01Q 9/42*     (2006.01)
    *H01Q 5/35*     (2015.01)
    *H01Q 5/378*     (2015.01)

(58) Field of Classification Search
    USPC .......................................... 455/562.1, 575.7
    See application file for complete search history.

(56) References Cited

U.S. PATENT DOCUMENTS

| | | |
|---|---|---|
| 2012/0146858 A1 | 6/2012 | Tsai et al. |
| 2012/0262345 A1 | 10/2012 | Kim et al. |
| 2013/0135157 A1 | 5/2013 | Tsou et al. |
| 2014/0071022 A1 | 3/2014 | Na |
| 2014/0120991 A1* | 5/2014 | Wong ................... H01Q 5/35 455/575.1 |
| 2014/0168015 A1 | 6/2014 | Kim |
| 2014/0333488 A1 | 11/2014 | Wang et al. |
| 2015/0171916 A1* | 6/2015 | Asrani .................. H04B 1/68 455/575.7 |
| 2015/0270990 A1* | 9/2015 | Chiu ..................... H04B 1/18 455/575.5 |

OTHER PUBLICATIONS

European Search Report dated Jun. 28, 2016 issued in counterpart application No. 16157630.1-1811, 6 pages.

* cited by examiner

ELECTRONIC DEVICE INCLUDING ANTENNA DEVICE

PRIORITY

This application claims priority under 35 U.S.C. §119(a) to a Korean Patent Application filed in the Korean Intellectual Property Office on Feb. 26, 2015, and assigned Serial No. 10-2015-0027594, the entire disclosure of which is incorporated herein by reference.

BACKGROUND

1. Field of Disclosure

The present disclosure relates generally to an electronic device, and more particularly, to an electronic device including an antenna device.

2. Description of the Related Art

An electronic device is a device that executes a specific function according to a loaded program. The electronic device may include a home appliance, an electronic notebook, a portable multimedia player (PMP), a mobile communication terminal, a tablet personal computer (PC), a video/audio device, a desktop/laptop computer, an in-vehicle navigator, etc. These electronic devices may output stored information visually or audibly. Along with an increase in the integration level of electronic devices and the increasing popularity of ultra-high-speed, large-capacity wireless communication, various functions have recently been loaded in a single electronic device. For example, an entertainment function, such as gaming, a multimedia function such as music/video play, a communication and security function for mobile banking, a scheduling function, and an electronic wallet function, as well as a communication function have been integrated in a single electronic device.

As an electronic device is provided with an antenna device, the electronic device may conduct wireless communication. For example, various antenna devices are available for the electronic device, inclusive of a near field communication (NFC) antenna device, a local area network (LAN) antenna device, an antenna device for connectivity to a commercial communication network, etc. Since various antenna devices may be mounted in a single electronic device, the electronic device may ensure an optimal communication environment by selecting an antenna device suitable for a use environment or an operation mode.

Further, with the introduction of carrier aggregation (CA), communication is conducted simultaneously in different frequency bands, thereby implementing ultra-high-speed, large-capacity wireless communication. For example, it is possible to transmit and enjoy images with ultra-high video quality between users in real time. Thus, ultra-high-speed, large-capacity wireless communication may be enabled by use of an electronic device, or an antenna device suitable for the electronic device, on the part of a user as well as on the part of a service provider.

However, although an antenna device for CA is able to simultaneously operate in different frequency bands, it may be difficult to secure space for installing the antenna device in a small-sized electronic device, such as a mobile communication terminal.

It may also be difficult to ensure the performance of an antenna device in an electronic device having a metal case, which is often provided to give the electronic device a sophisticated look and for impact resistance. That is, the metal case may be an obstacle to transmission and reception of the antenna device.

SUMMARY

The present disclosure has been made to address at least the problems and disadvantages described above, and to provide at least the advantages described below.

Accordingly, an aspect of the present disclosure is to provide an electronic device having an antenna device for which an installation space is easily secured and which can operate simultaneously in different frequency bands.

Accordingly, another aspect of the present disclosure is to provide an electronic device having an antenna device which provides sophisticated looks through a case at least partially formed of a metal, and which ensures stable wireless transmission and reception performance.

Accordingly, another aspect of the present disclosure is to provide an electronic device having an antenna device which forms resonant frequencies in an intermediate frequency band and a high frequency band, thus making the antenna device suitable for carrier aggregation.

Accordingly, another aspect of the present disclosure is to provide an electronic device having an antenna device with first and second radiation conductors connected to separate power supplies, thereby allowing the second radiation conductor to form a resonant frequency in a low frequency band; and when the second radiation conductor forms a resonant frequency in the low frequency band by receiving power separately, while being used for formation of resonant frequencies in intermediate and high frequency bands, sufficient isolation is secured to operate the second radiation conductor and a fourth radiation conductor in different frequency bands.

In accordance with an aspect of the present disclosure, an electronic device is provided. The electronic device includes a case member, a frame disposed around a periphery of one surface of the case member, forming sidewalls, and an antenna device for transmitting and receiving wireless signals. The antenna device includes a first radiation conductor forming a first part of the frame, a second radiation conductor disposed in a vicinity of the first radiation conductor, forming a second part of the frame, a third radiation conductor provided on the case member and connected to a first power supply of the electronic device, together with the first radiation conductor, and a fourth radiation conductor provided on the case member and connected to a ground of the electronic device. At least a part of the fourth radiation conductor is disposed in a vicinity of the second radiation conductor.

In accordance with another aspect of the present disclosure, a portable electronic device is provided. The portable electronic device includes a front cover forming a front surface of the portable electronic device, a rear cover forming a rear surface of the portable electronic device, a conductive sidewall surrounding at least a part of a space formed between the front cover and the rear cover, and including a first part surrounding a corner of the portable electronic device and a second part extended in a first direction, isolated from the first part, a display device disposed in the space and including a screen area exposed through the front cover, a non-conductive structure disposed in a vicinity of the conductive sidewall or contacting the conductive sidewall in the space, and including a first surface facing the front cover and a second surface facing the rear cover, a first antenna pattern electrically connected to the first part, and including a first area overlapping with the non-conductive structure, the first area extended in the first direction, a second antenna pattern including a second area overlapping with the non-conductive structure, the second area extended substantially in the first direction between the second part and the first area, and one or more integrated circuit chips electrically connected to at least one of the first antenna pattern and the second antenna pattern.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS OF THE PRESENT DISCLOSURE

Figure 1:
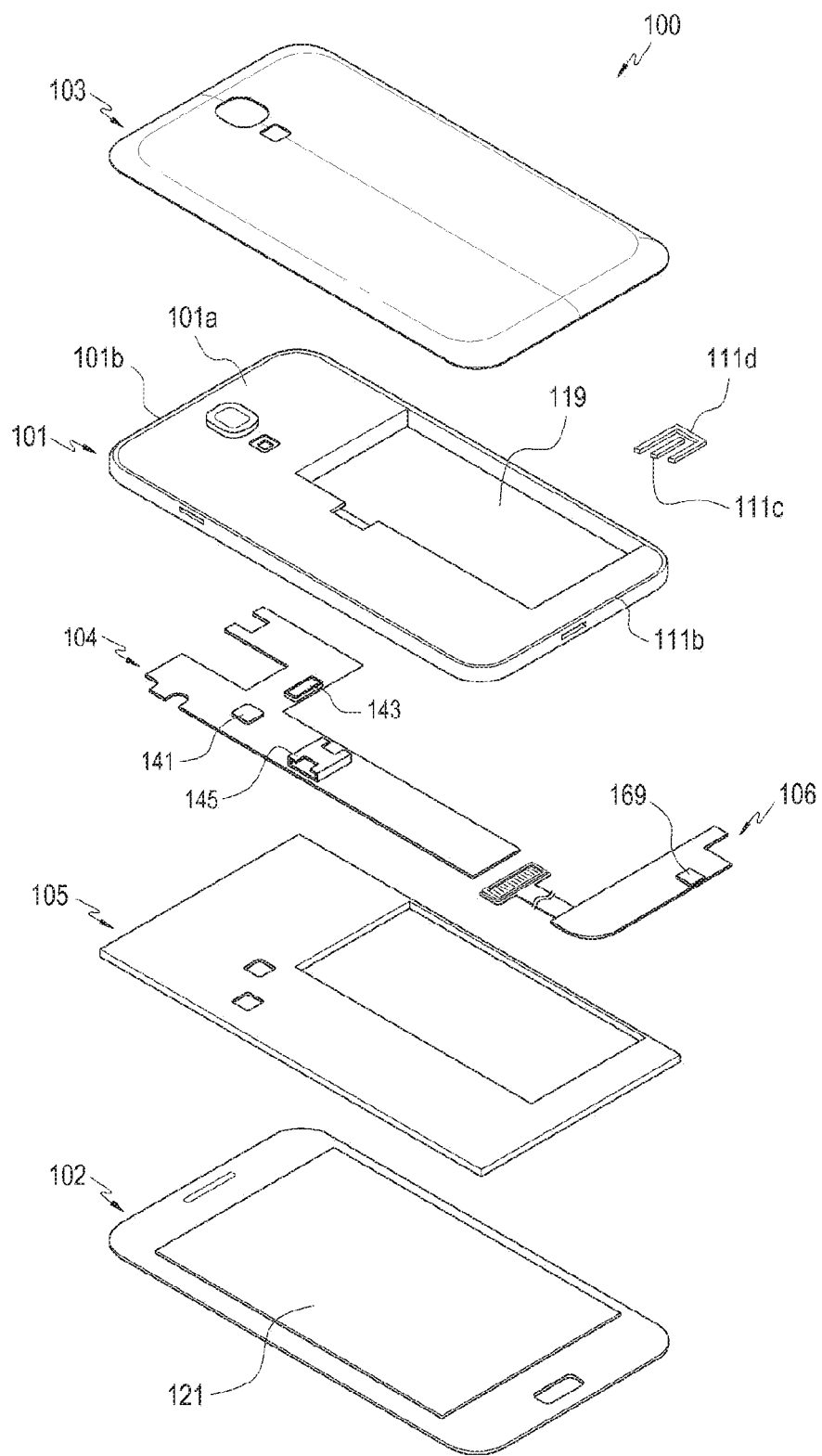
FIG. 1 is an exploded perspective view illustrating an electronic device, according to an embodiment of the present disclosure.

Various embodiments of the present disclosure are described with reference to the accompanying drawings. However, the scope of the present disclosure is not intended to be limited to the particular embodiments and it is to be understood that the present disclosure covers all modifications, equivalents, and/or alternatives falling within the scope and spirit of the present disclosure. In relation to a description of the drawings, like reference numerals denote the same components.

As used herein, the terms 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of A, (2) inclusion of B, and (3) inclusion of A and B.

Terms such as 'first' or 'second', as used in the present disclosure, may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing from the scope of the present disclosure.

When it is said that a component (for example, a first component) is operatively or communicatively 'coupled with/to' or 'connected to' another component (for example, a second component), it should be understood that the first component is connected to the second component directly or through another component (for example, a third component). On the other hand, when it is said that a component (for example, a first component) is 'directly connected to' or 'directly coupled to' another component (for example, a second component), it may be understood that there is no other component (for example, a third component) between the first and second components.

The term 'configured to', as used herein, may be used interchangeably with, for example, the term 'suitable for', 'having the capacity to', 'designed to', 'adapted to', 'made to', or 'capable of' based on the circumstances. The term 'configured to' does not necessarily mean 'specifically designed to' in hardware. Instead, the term 'configured to' may mean that a device is 'capable of' operating with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

The terms, as used in the present disclosure, are merely provided to describe specific embodiments, and are not intended to limit the scope of other embodiments. It is to be understood that singular forms include plural referents unless the context clearly dictates otherwise. In the present disclosure, the terms 'have', 'may have', 'include', or 'may include' signify the presence of a specific feature, number, step, operation, component, part, or their combination, and do not exclude the presence or addition of one or more other features, numbers, steps, operations, components, parts, or a combination thereof.

Unless otherwise defined, the terms and words, including technical or scientific terms, used in the following description and claims may have the same meanings as generally understood by those skilled in the art to which the present disclosure pertains. The terms used herein as generally defined in a dictionary should be interpreted as having the same or similar meanings as or to contextual meanings customary in the relevant related technology. Unless otherwise defined, the terms should not be interpreted as having idealized or excessively formal meanings. When needed, even the terms as defined in the present disclosure are not to be interpreted as excluding embodiments of the present disclosure.

In the present disclosure, an electronic device may be any device having a touch panel. An electronic device may be referred to as a terminal, a portable terminal, a mobile terminal, a communication terminal, a portable communication terminal, a display device, etc.

For example, an electronic device may be a smartphone, a portable phone, a navigation device, a television (TV), an in-vehicle head unit, a laptop computer, a tablet computer, a portable multimedia player (PMP), a personal digital assistant (PDA), etc. An electronic device may be configured as a pocket-sized portable communication terminal having wireless communication functionality. Further, an electronic device may be a flexible device or a flexible display device.

The electronic device may communicate with an external electronic device such as a server and perform a task in conjunction with an external electronic device. For example, the electronic device may transmit an image captured by a camera and/or location information detected by a sensor unit to a server through a network. The network may be, but is not limited to, a mobile or cellular communication network, a local area network (LAN), a wireless local area network (WLAN), a wide area network (WAN), the Internet, a small area network (SAN), etc.

The terms low frequency band', 'intermediate frequency band', and 'high frequency band' will be used in describing specific embodiments of the present disclosure. It is to be understood that these terms are relative representations of different resonant frequencies formed by an antenna device according to various embodiments of the present disclosure. For example, even though a resonant frequency of 1.8 GHz may be defined as an intermediate frequency band in one embodiment of the present disclosure, it may be a low frequency band or a high frequency band in another embodiment of the present disclosure. Also, if an antenna device forms resonant frequencies in two different frequency bands in one embodiment of the present disclosure, a relatively high frequency may be defined as a 'high frequency band' and a relatively low frequency may be defined as a low frequency band'.

Further, specific frequency values may be stated for a low frequency band', an 'intermediate frequency band', and a 'high frequency band' in describing specific embodiments of the present disclosure. However, these values are given to help in an understanding of various embodiments of the present disclosure, and are not intended to limit the scope of the present disclosure. For example, the frequency values of resonant frequency bands formed by an antenna device may be changed appropriately according to a use environment of an electronic device or a frequency band allocated to a service provider.

FIG. 1 is an exploded perspective view of an electronic device, according to an embodiment of the present disclosure.

Referring to FIG. 1, an electronic device 100 is provided. The electronic device 100 includes a case 101, a front cover 102, a cover member 103, a first circuit board 104, a support member 105, and a second circuit board 106.

The case 101 includes a case member 101*a*, a frame 101*b* disposed around the periphery of one surface of the case member 101*a*, forming sidewalls of the case 101, and an antenna device using at least a part of the case 101, including the case member 101*a* and the frame 101*b*, as a radiation conductor. A front surface of the case 101 is opened. That is, as the case member 101*a* forms a rear surface of the case 101, and the frame 101*b* forms the sidewalls of the case 101, the case 101 forms an accommodation space on the opened front surface. At least a part of the case 101 may be formed of a metal and another part of the case 101 may be formed of a synthetic resin. For example, the case member 101*a* may be formed of the synthetic resin, and a part or the whole of the frame 101*b* may be formed of the metal. If the case 101 is formed of the metal and the synthetic resin in combination, the case 101 may be fabricated by insert injection molding. For example, with the frame 101*b* formed of a metal placed in a mold, the case member 101*a* is formed by injecting a melted synthetic resin into the mold. Thus, the case 101 may be formed by combining the frame 101*b* with the case member 101*a*, simultaneously with molding the case member 101*a*. The metal part of the frame 101*b* may form a part of the antenna device in the electronic device 100.

The front cover 102 is mounted on the front surface of the case 101. The front cover 102 includes a window member combined with a display device 121. According to various embodiments, a touch panel is incorporated into the front cover 102, thus providing functionalities of an input device.

The first circuit board 104 and the second circuit board 106 are accommodated in the case 101. For example, the case 101 accommodates the first circuit board 104 and the second circuit board 106 on which electronic parts are mounted, such as an integrated circuit (IC) chip 141 with an application processor (AP), a communication module, a memory, an audio module, and a power management module, various sensors, a connector 143, a storage medium socket 145, and a connector 169 for connecting to the antenna device or an external device. The above electronic parts may be distributed to the first circuit board 194 and the second circuit board 106. For example, the IC chip 141 may be mounted on the first circuit board 104, and the connector 169 for connecting to a part of the antenna device or an external device may be mounted on the second circuit board 106. The IC chip 141 includes at least one of, for example, an AP, a communication module, and an audio module.

The first circuit board 104 and the second circuit board 106 are fabricated to be suitable for the shape of the accommodation space defined in the case 101. For example, the case 101 may provide a mounting recess 119 for accommodating a battery, and in this case, the first circuit board 104 and the second circuit board 106 are fabricated in a shape suitable for arrangement around the mounting recess 119 inside the case 101.

The support member 105 is accommodated in the case 101. The support member 105 increases the mechanical strength of the electronic device 100, and protects and isolates various internal electronic parts from each other. For example, if various electronic parts, including the IC chip 141, which are mounted on the first circuit board 104 and the second circuit board 106, are brought into direct contact with the display device 121, the display device 121 may be damaged. Accordingly, the support member 105 is interposed between the display device 121 and the first circuit board 104 and the second circuit board 106, to thereby prevent direct contact between the electronic parts and the display device 121. The support member 105 may also shield electromagnetic waves generated from operations of the electronic parts, thus preventing the effect of the electromagnetic waves on operations of other electronic parts. For example, since the support member 105 is provided, the display device 121 operates stably without being affected by electromagnetic waves generated from other electronic parts. Further, the support member 105 may provide structures for mounting and fixing the first and second circuit boards 104 and 106, and for keeping the front cover 102 flat by supporting the front cover 102.

The cover member 103 is rear cover detachably mounted onto the rear surface of the case 101. With the cover member 103 removed, the mounting recess 119 is opened and thus a user may replace the battery. Among the foregoing electronic parts, the storage medium socket 145 may be exposed from the rear surface of the case 101. However, the mounting recess 119 or the storage medium socket 145 may be isolated and protected from an ambient environment by mounting the cover member 103 on the rear surface of the case 101. The antenna device of the electronic device 100 may be connected to the communication module provided in the form of the IC chip 141, or a set of IC chips, among the foregoing electronic parts, thus providing wireless transmission and reception functionality. The antenna device may use, as a radiation conductor, at least a metal part (for example, a part of the frame 101b) exposed outward from the electronic device 100, such as a first radiation conductor 111a and a second radiation conductor 111b (shown in FIG. 2). The electronic device 100 may also include a third radiation conductor 111c and a fourth radiation conductor 111d.

Figure 2:
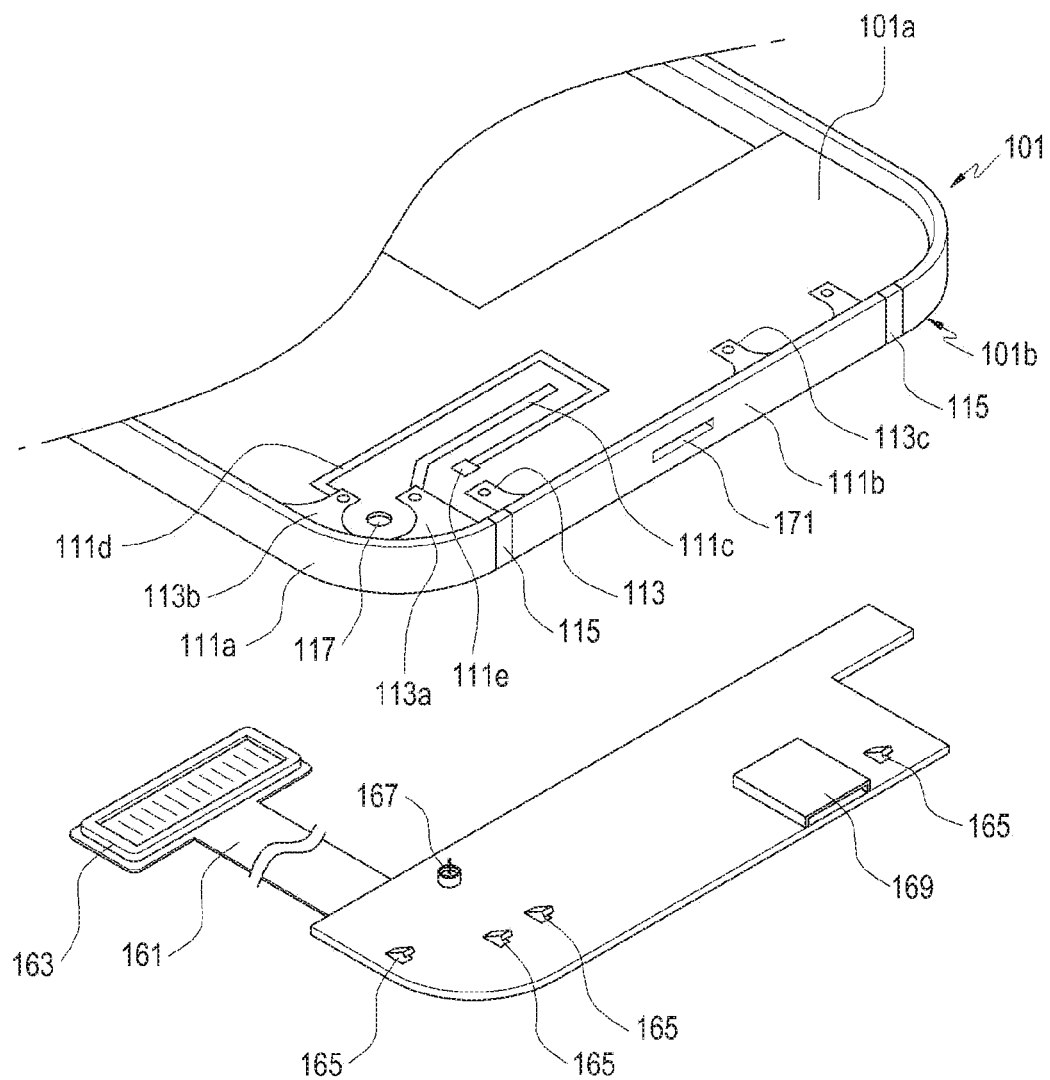
FIG. 2 is an exploded perspective view illustrating an antenna device in an electronic device, according to an embodiment of the present disclosure.

FIG. 2 is an exploded perspective view illustrating an antenna device in an electronic device, according to an embodiment of the present disclosure. Referring to FIG. 2, the case 101 is provided. The frame 101b of the case 101 may be fabricated of a conductive metal and includes dividing portions 115 from which the metal has been partially eliminated. If the electronic device 100 includes the connector 169 (for example, an interface connector) for connection to another electronic device (for example, a charger), the frame 101b includes an opening 171 to provide a connection path to the connector 169.

As previously stated, the case member 101a may be fabricated of a synthetic resin, whereas the frame 101b may be fabricated of a metal. To reinforce an engagement force between the metal part and the synthetic resin part when the frame 101b and the case member 101a are integrated by a process such as insert injection molding, the frame 101b is provided with a plurality of engagement pieces 113, 113a, 113b, and 113c. The plurality of engagement pieces 113, 113a, 113b, and 113c protrude from an inner surface of the frame 101b and thus reside in the case member 101a, thereby reinforcing the engagement force between the metal part and the synthetic resin part. The plurality of engagement pieces 113, 113a, 113b, and 113c may also be used as connection pieces that electrically connect a part of the frame 101b to the second circuit board 106. For example, as the plurality of engagement pieces 113, 113a, 113b, and 113c are connected to the second circuit board 106, at least a part of the frame 101b may be used as a radiation conductor.

A part of the frame 101b, for example, a corner of the frame 101b at which different side surfaces of the electronic device 100 are connected, may be used as the first radiation conductor 111a of the antenna device. A first pair of engagement pieces 113a and 113b is arranged on either side of an engagement hole 117 on an inside part corresponding to the first radiation conductor 111a. Another part of the frame 101b, for example, a metal part between the dividing portions 115 may be used as the second radiation conductor 111b of the antenna device. The second radiation conductor 111b extends along one side surface of the case 101 from a point adjacent to the first radiation conductor 111a, and is isolated from the first radiation conductor 111a by a dividing portion 115. The second radiation conductor 111b is also another part of the frame 101b and a second pair of engagement pieces 113 and 113c is formed inside the second radiation conductor 111b.

The electronic device 100 includes the third radiation conductor 111c and the fourth radiation conductor 111d.

The third radiation conductor 111c extends from a first point of the first radiation conductor 111a along the second radiation conductor 111b (in parallel with the second radiation conductor 111b or in an inclined direction with respect to the second radiation conductor 111b). The third radiation conductor 111c includes a conductive pattern arranged and formed on an outer surface (or alternatively, on an inner surface) of the case member 101a, and extends from the first engagement piece 113a protruding from an inner surface of the first radiation conductor 111a. The first radiation conductor 111a and the third radiation conductor 111c receive power through the first point (for example, the first engagement piece 113a). The fourth radiation conductor 111d includes a conductive pattern arranged and formed on the outer surface (or alternatively, on an inner surface) of the case member 101a, and is disposed in the vicinity of the second radiation conductor 111b. The fourth radiation conductor 111d extends at least partially along with the second radiation conductor 111b (in parallel with the second radiation conductor 111b or in an inclined direction with respect to the second radiation conductor 111b).

According to an embodiment of the present disclosure, a first end of the fourth radiation conductor 111d extends from a third point (for example, a point at which a connection land 111e is disposed) in an area between the third radiation conductor 111c and the second radiation conductor 111b, and connected to a ground of the electronic device 100.

According to another embodiment of the present disclosure, a first part of the fourth radiation conductor 111d extends from the area between the second radiation conductor 111b and the third radiation conductor 111c, and a second part of the fourth radiation conductor 111d extends to surround a part of an area in which the third radiation conductor 111c is disposed. When the fourth radiation conductor 111d is extended to partially surround the area in which the third radiation conductor 111c is disposed, a second end of the fourth radiation conductor 111d is connected to a second point of the first radiation conductor 111a, for example, the second engagement piece 113b protruding from the inner surface of the first radiation conductor 111a. The first radiation conductor 111a and the fourth radiation conductor 111d are connected to the ground of the electronic device 100 through the second point (for example, the second engagement piece 113b). When the fourth radiation conductor 111d is disposed to surround the third radiation conductor 111c, the third radiation conductor 111c is disposed in a slot formed by the fourth radiation conductor 111d. The connection land 111e is provided in the area between the second radiation conductor 111b and the third radiation conductor 111c. The connection land 111e is connected to the first end of the fourth radiation conductor 111d, thus connecting the fourth radiation conductor 111d to the ground of the electronic device 100.

The second circuit board 106 provides an electrical connection structure to the first to fourth radiation conductors 111a, 111b, 111c, and 111d. For example, the second circuit board 106 may include a flexible circuit board (FCB) or a ribbon cable 161, and another connector 163 provided at an end of the ribbon cable 161, to be connected to the first circuit board 104. The second circuit board 106 includes a plurality of connection terminals 165 contactable to the first to fourth radiation conductors 111a, 111b, 111c, and 111d. The connection terminals 165 include the same metal as included in the first or second radiation conductor 111a or 111b.

According to an embodiment of the present disclosure, a coaxial connector 167 is provided to the second circuit board 106. If the communication module is disposed on the first circuit board 104, wireless signals may be transmitted and received between the first and second circuit boards 104 and 106 via the coaxial connector 167.

Figure 3:
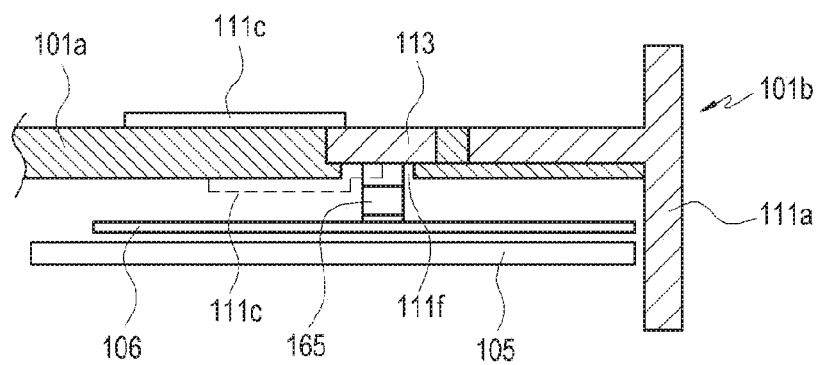
FIG. 3 is a sectional view illustrating a part of an antenna device in an electronic device, according to an embodiment of the present disclosure.
Figure 4:
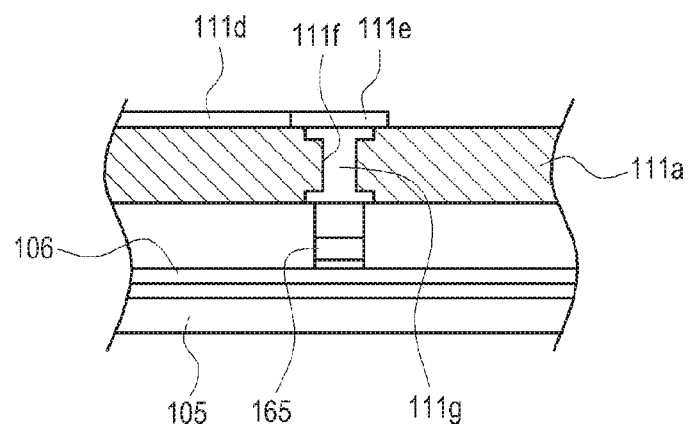
FIG. 4 is a sectional view illustrating another part of an antenna device in an electronic device, according to an embodiment of the present disclosure.

FIG. 3 is a sectional view illustrating a part of an antenna device in an electronic device, according to an embodiment of the present disclosure, and FIG. 4 is a sectional view illustrating another part of an antenna device in an electronic device, according to an embodiment of the present disclosure.

Referring to FIGS. 3 and 4, the connection terminals 165 contact the first, third, and fourth radiation conductors 111a, 111c, and 111d, at the first, second, and third points, respectively. For example, when the second circuit board 106 is accommodated and installed in the case 101, each of the connection terminals 165 is positioned in correspondence with the first and second engagement pieces 113a and 113b, or the connection land 111e. To connect the connection land 111e to the connection terminals 165, a via hole 111f is formed in the case member 101a.

According to an embodiment of the present disclosure, the engagement piece 113 is disposed on the via hole 111f, or an additional conductor 111g may be disposed in the via hole 111f. For example, the first end of the fourth radiation conductor 111d may be connected to one of the connection terminals 165 through the connection land 111e and the via hole 111f (or the conductor 111g). While not shown, the second radiation conductor 111b may also be connected to the ground or a power supply of the electronic device 100 through one of the connection terminals 165 on the second circuit board 106 and the third engagement piece 113c. The second radiation conductor 111b receives second power different from the power supplied to the first radiation conductor 111a. If the second radiation conductor 111b receives power separately, an additional coaxial connector is disposed on the second circuit board 106.

In the specific embodiment of the present disclosure described herein, the third radiation conductor 111c and the fourth radiation conductor 111d are shown as formed on the outer surface of the case member 101a, however, this should not be construed as limiting the present disclosure. For example, the third radiation conductor 111c and the fourth radiation conductor 111d may be formed on the inner surface of the case member 101a, as indicated by the dotted line illustrated in FIG. 3. According to another embodiment of the present disclosure, the third radiation conductor 111c and the fourth radiation conductor 111d may be formed, respectively, on the inner and outer surfaces of the case member 101a.

Figure 5:
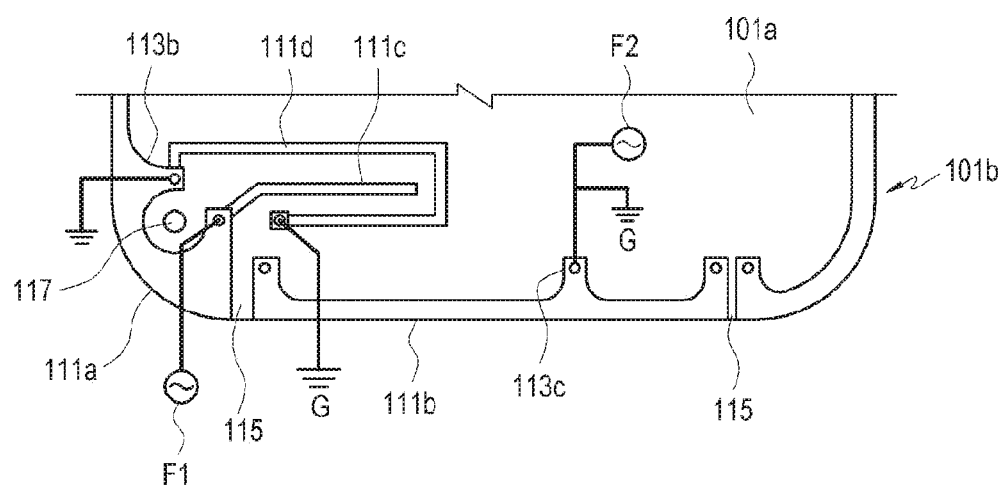
FIG. 5 illustrates a structure of an antenna device in an electronic device, according to an embodiment of the present disclosure.
Figure 6:
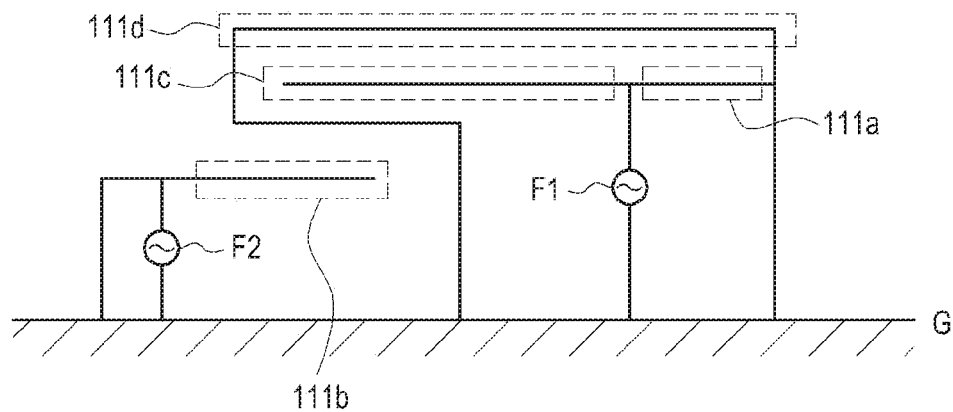
FIG. 6 is a circuit diagram illustrating an antenna device in an electronic device, according to an embodiment of the present disclosure.

FIG. 5 illustrates a structure of an antenna device in an electronic device, according to an embodiment of the present disclosure, and FIG. 6 is a circuit diagram illustrating an antenna device in an electronic device, according to an embodiment of the present disclosure.

Referring to FIGS. 5 and 6, the above-described antenna device of the electronic device 100 may be configured in an inverted-F antenna structure. That is, when the second radiation conductor 111b receives power separately, the electronic device 100 includes an antenna device configured in a plurality of inverted-F antenna structures. For example, the first radiation conductor 111a and the third radiation conductor 111c are connected to a power supply F1 and a ground G, respectively, thus forming an inverted-F antenna structure, and the second radiation conductor 111b are connected to an additional power supply F2 and the ground G, thus forming another inverted-F antenna structure. The ground G connected to the first radiation conductor 111a and the third radiation conductor 111c, and the ground G connected to the second radiation conductor 111b may be a common ground provided in the electronic device 100.

According to an embodiment of the present disclosure, an inverted-F antenna structure is formed by connecting a point at which the first radiation conductor 111a and the third radiation conductor 111c are connected to the ground G and connecting one end portion of the first radiation conductor 111a, for example, the second engagement piece 113b to the power supply F1. For example, the points of the first radiation conductor 111a connected to the power supply F1 and the ground G may be set in various manners.

The fourth radiation conductor 111d is electromagnetically coupled with the third radiation conductor 111c, thus being used as a part of the antenna device. The fourth radiation conductor 111d forms a slot in which the third radiation conductor 111c is accommodated. Irrespective of a separate power supply to the second radiation conductor 111b, the second radiation conductor 111b is electromagnetically coupled with the fourth radiation conductor 111d, thus contributing to formation of a plurality of resonant frequencies.

As described above, in the electronic device 100 according to various embodiments of the present disclosure, a part (for example, the radiation conductors) of the antenna device may be formed by connecting the metal part of the case 101 to a power supply or ground of the electronic device 100. In using a part of the case 101 as radiation conductors of the antenna device, it may be difficult to optimize the layout and characteristics of the antenna device according to a specification required for the electronic device 100. For example, although it may be typical to adjust the length of a radiation conductor for control of a resonant frequency, this may affect the outward looks of the electronic device. The antenna device may be readily optimized, for example, a resonant frequency may be controlled by arranging the third radiation conductor 111c and the fourth radiation conductor 111d, using the metal part of the case 101 as radiation conductors of the antenna device in the electronic device 100.

Figure 7:
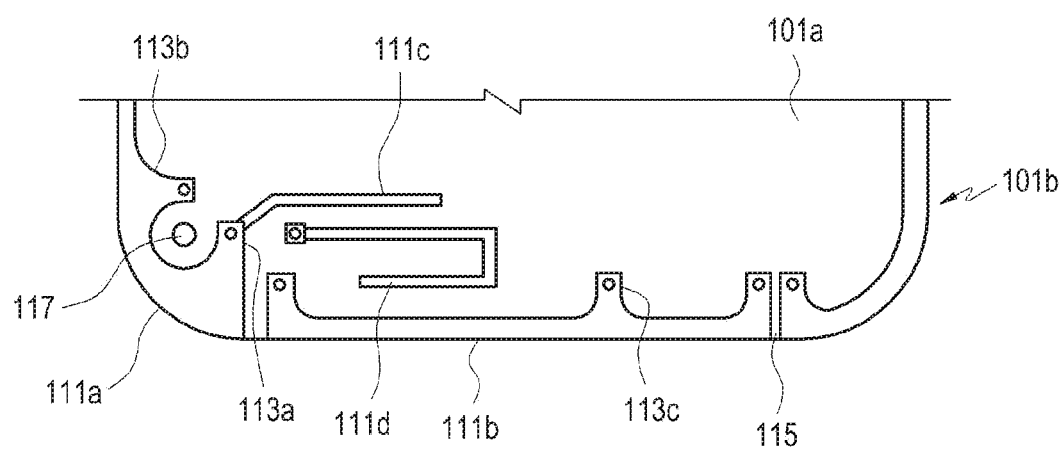
FIGS. 7, 8, and 9 illustrate various configurations of an antenna device in an electronic device, according to embodiments of the present disclosure.
Figure 8:
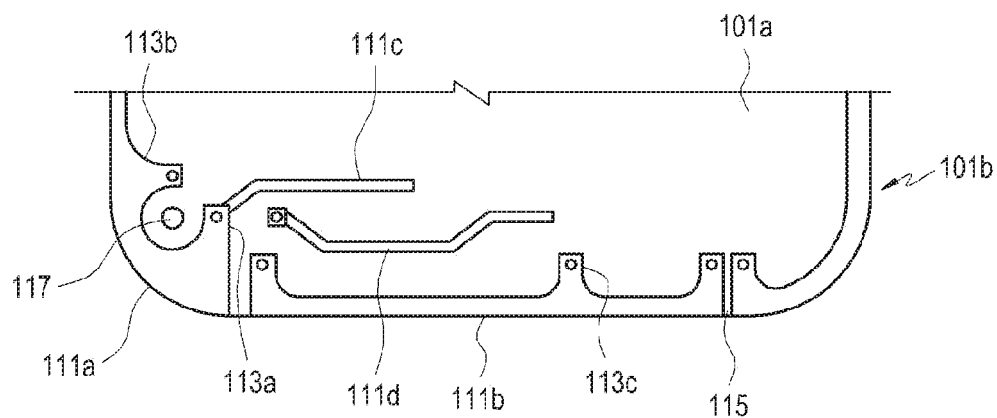
Figure 9:
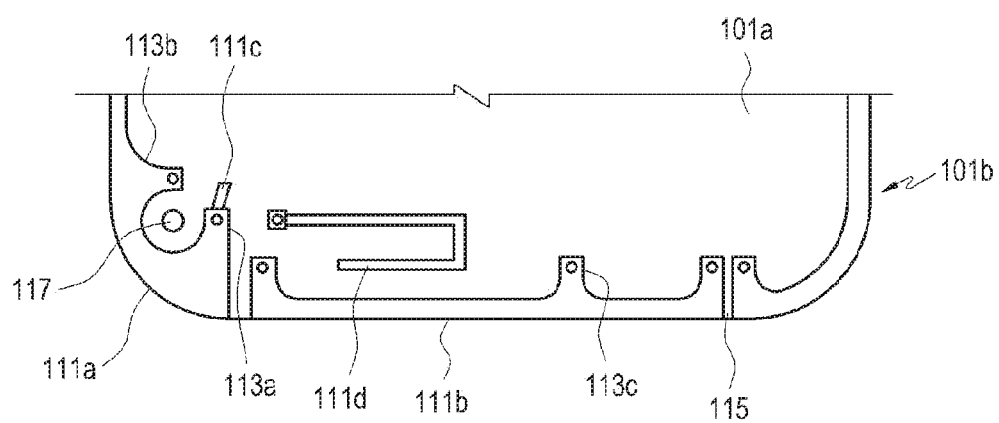

FIGS. 7, 8, and 9 illustrate various configurations of an antenna device in an electronic device, according to various embodiments of the present disclosure.

Referring to FIGS. 7, 8, and 9, an electronic device 100 is provided illustrating the third radiation conductor 111c and the fourth radiation conductor 111d with varying lengths and arrangements. As previously described, when the metal part of the case 101 of the electronic device 100 is used as radiation conductors of the antenna device, radiation characteristics may be controlled appropriately according to the length and arrangement of each of the third radiation conductor 111c and the fourth radiation conductor 111d. Since the shapes of the first radiation conductor 111a and the second radiation conductor 111b may be kept unchanged, stable radiation performance may be secured without affecting the exterior of the electronic device 100, when the antenna device is configured.

Figure 10:
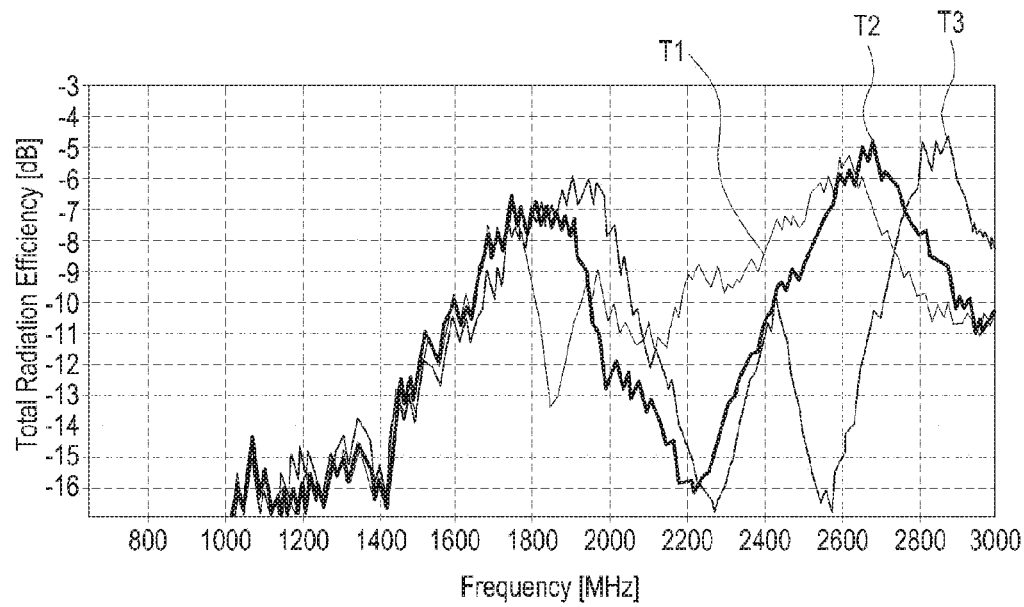
FIG. 10 is a graph illustrating radiation efficiency measured according to a first configuration of a fourth radiation conductor in an antenna device of an electronic device, according to embodiments of the present disclosure.

FIG. 10 is a graph illustrating radiation efficiency measured according to a first configuration of a fourth radiation conductor in an antenna device of an electronic device, according to various embodiments of the present disclosure.

Referring to FIG. 10, the graph shows total radiation efficiency measured for different lengths of the fourth radiation conductor 111d of the electronic device 100, in a configuration (for example, the configuration illustrated in FIG. 5) in which the fourth radiation conductor 111d forms a slot and the third radiation conductor 111c is partially accommodated in the slot.

Curve T1 shows the radiation efficiency of an antenna device with the fourth radiation conductor 111d having a length set to 33 mm. It is noted from curve T1 that resonant frequencies are formed in about 1.75 GHz and about 2.6 GHz.

Curve T2 shows the radiation efficiency of an antenna device with the fourth radiation conductor 111d having a length set to 31 mm. It is noted from curve T2 that resonant frequencies are formed in about 1.8 GHz and about 2.7 GHz.

Curve T3 shows the radiation efficiency of an antenna device with the fourth radiation conductor 111d having a length set to 29 mm. It is noted from curve T3 that resonant frequencies are formed in about 1.9 GHz and about 2.8 GHz.

As previously described, a resonant frequency in a high frequency band may be controlled by adjusting the length of the fourth radiation conductor 111d in the antenna device. When the fourth radiation conductor 111d forms a slot in which the third radiation conductor 111c is accommodated, a resonant frequency (for example, a high-frequency band resonant frequency) of the antenna device may be controlled by controlling the length of the slot.

Figure 11:
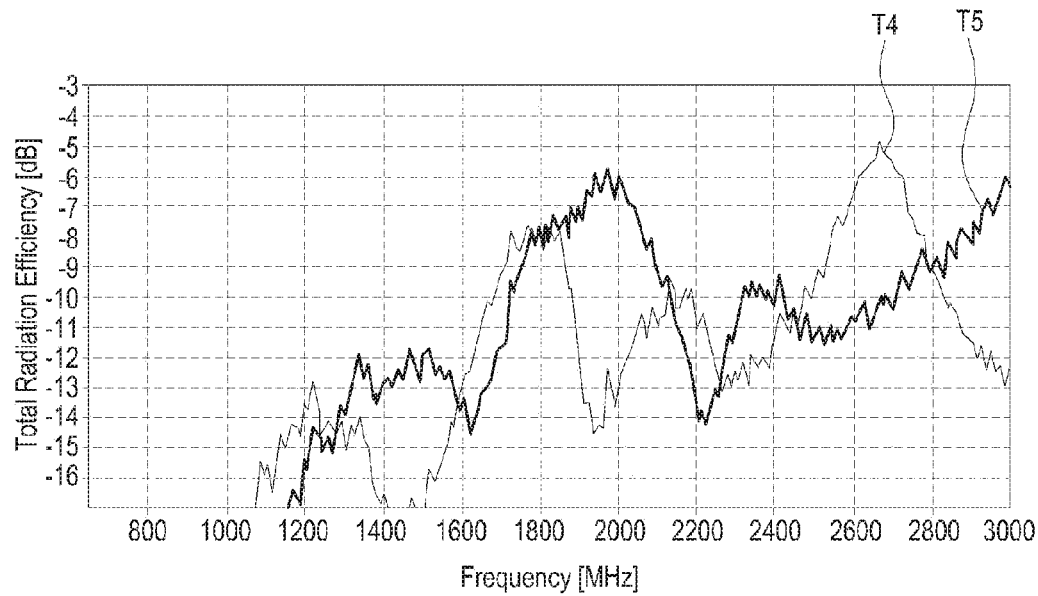
FIG. 11 is a graph illustrating radiation efficiency measured in the presence and absence of a second radiation conductor in an antenna device of an electronic device, according to an embodiment of the present disclosure.

Also, as previously described, power may be separately supplied to the second radiation conductor 111b. For example, when power is separately supplied to the second radiation conductor 111b, a resonant frequency is formed in a relatively low frequency band, for example, in about 800 MHz in the antenna device. Even when power is separately supplied to the second radiation conductor 111b, the second radiation conductor 111b is sufficiently isolated. Thus, the above-described antenna device ensures good radiation efficiency even in an intermediate frequency band (for example, 1.8 GHz) or a high frequency band (for example, 2.6 GHz or above). FIG. 11 is a graph illustrating radiation efficiency measured in the presence and absence of a second radiation conductor in an antenna device of an electronic device, according to an embodiment of the present disclosure.

Referring to FIG. 11, curve T4 shows radiation efficiency measurements in the presence of the second radiation conductor 111b in the antenna device of the electronic device 100, and curve T5 shows radiation efficiency measurements in the absence of the second radiation conductor 111b in the antenna device under the same conditions. It is noted that a stable resonant frequency is secured in an intermediate frequency band (for example, 1.8 GHz) irrespective of whether the second radiation conductor 111b is present or not. On the other hand, in the absence of the second radiation conductor 111b, radiation efficiency has been decreased greatly in a high frequency band (for example, 2.7 GHz) from radiation efficiency prior to removal of the radiation conductor 111b. Thus, it may be concluded that as the second radiation conductor 111b is electromagnetically coupled with the fourth radiation conductor 111d, the second radiation conductor 111b contributes to formation of a resonant frequency in a high frequency band.

Figure 12:
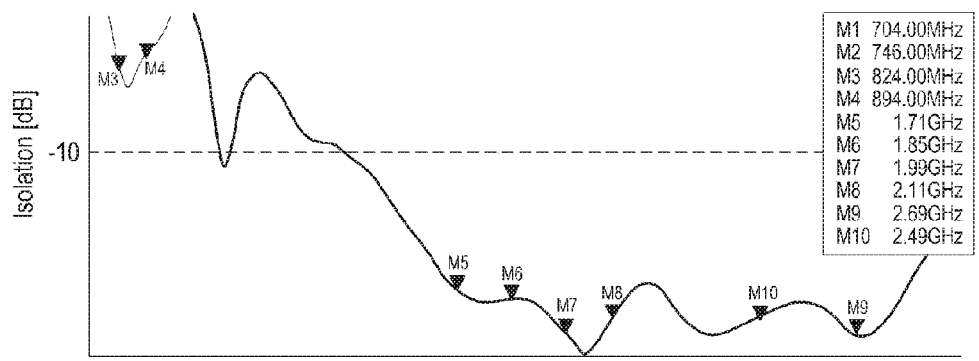
FIGS. 12, 13, and 14 are graphs illustrating isolation characteristics measured according to a second configuration of a fourth radiation conductor in an antenna device of an electronic device, according to an embodiment of the present disclosure.
Figure 13:
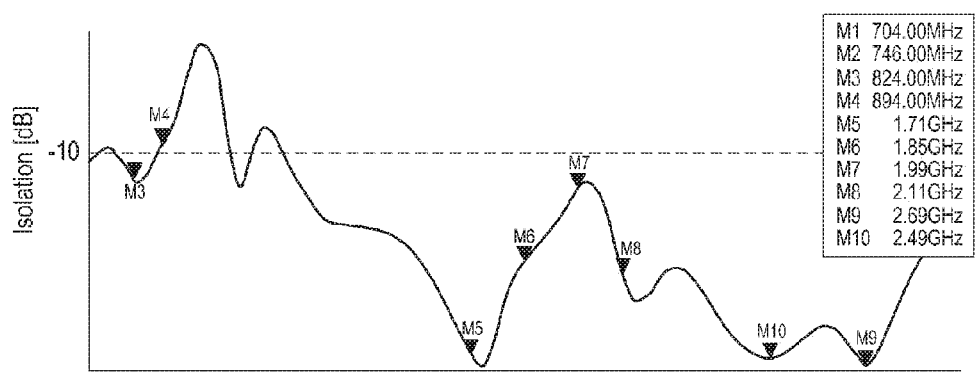
Figure 14:
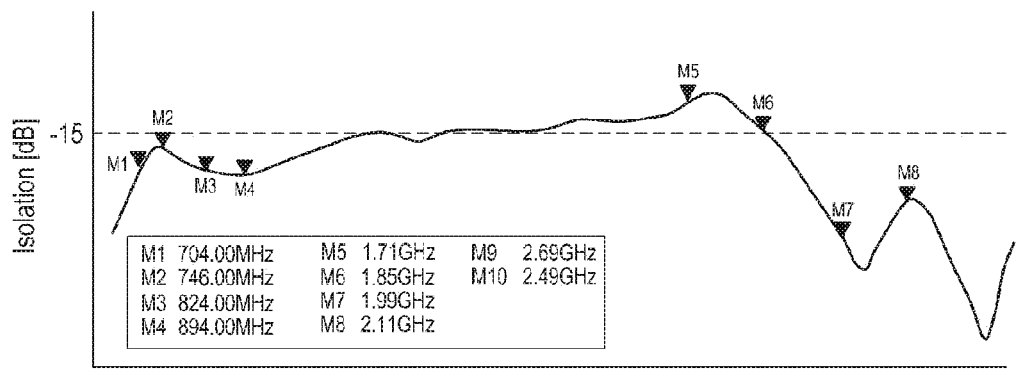
Figure 15:
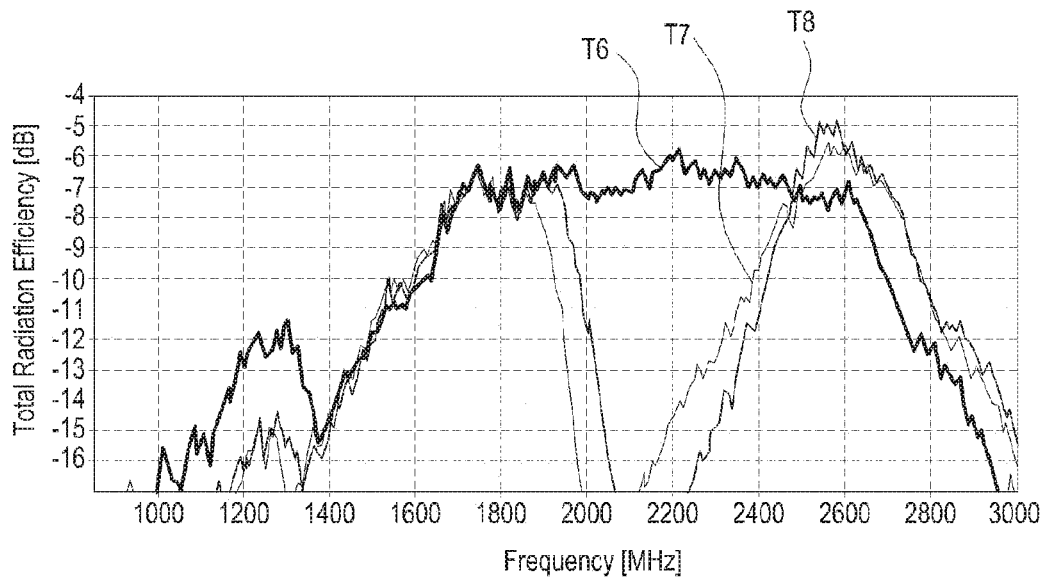
FIG. 15 is a graph illustrating radiation efficiency measured according to a second configuration of a fourth conductor in an antenna device of an electronic device, according to embodiments of the present disclosure.

FIGS. 12, 13, and 14 are graphs illustrating isolation characteristics measured according to a second configuration of a fourth radiation conductor in an antenna device of an electronic device, according to an embodiment of the present disclosure. FIG. 15 is a graph illustrating radiation efficiency measurements according to a second configuration of a fourth radiation conductor in an antenna device of an electronic device, according to various embodiments of the present disclosure.

Referring to FIG. 12, a graph illustrating isolation characteristic measurements versus frequency bands in the absence of the fourth radiation conductor 111d in the antenna device of the electronic device 100 is provided. Referring to FIG. 15, curve T6 shows radiation efficiency measurements of the antenna device in the absence of the fourth radiation conductor 111d.

Referring to FIGS. 12 and 15, it is noted that in the absence of the fourth radiation conductor 111d, the isolation is low, e.g., below −10 dB, in a low frequency band (e.g., 824 MHz and 890 MHz). On the other hand, a high isolation, e.g., equal to or larger than −10 dB, is secured in an intermediate frequency band (for example, 1.71 GHz, 1.85 GHz, 1.99 GHz, and 2.11 GHz) and a high frequency band (for example, 2.49 GHz and 2.69 GHz). It is noted from curve T6, shown in FIG. 15, that the radiation efficiency is good in an intermediate frequency band or a high frequency band, in the absence of the fourth radiation conductor 111d.

Referring to FIG. 13, a graph illustrating isolation characteristic measurements versus frequency bands, with the fourth radiation conductor 111d disposed between the second radiation conductor 111b and the third radiation conductor 111c (i.e., the configuration illustrated in FIG. 8) in the antenna device of the electronic device 100 is provided. Referring to FIG. 15, curve T7 shows radiation efficiency measurements of the antenna device, with the fourth radiation conductor 111d disposed between the second radiation conductor 111b and the third radiation conductor 111c (i.e., the configuration illustrated in FIG. 8).

Referring to FIGS. 13 and 15, it is noted that an isolation equal to or larger than −10 dB is secured even in a low frequency band, when the fourth radiation conductor 111d is disposed between the second radiation conductor 111b and the third radiation conductor 111c (for example, in the configuration illustrated in FIG. 8). Although the isolation is slightly changed in an intermediate frequency band or a high frequency band due to the presence of the fourth radiation conductor 111d, the isolation is still kept at or above −10 dB and an isolation deviation per frequency band is also improved. It is noted from curve T7, shown in FIG. 15, that the radiation efficiency is improved in a high frequency band due to the presence of the fourth radiation conductor 111d. Compared to the configuration without the fourth radiation conductor 111d, the bandwidth of a resonant frequency is rather low in the configuration with the fourth radiation conductor 111d. However, considering that one channel uses a bandwidth of tens of MHz in wireless communication, the above-described antenna device provides stable wireless communication despite a slight decrease in the bandwidth of the resonant frequency.

Referring to FIG. 14, a graph illustrating isolation characteristic measurements versus frequency bands, with the third radiation conductor 111c accommodated in a slot formed by the fourth radiation conductor 111d (i.e., the configuration illustrated in FIG. 5) in the antenna device of the electronic device 100 is provided. Referring to FIG. 15, curve T8 shows radiation efficiency measurements of the antenna device, with the third radiation conductor 111c accommodated in a slot formed by the fourth radiation conductor 111d (i.e., the configuration illustrated in FIG. 5) in the antenna device.

Referring to FIGS. 14 and 15, it is noted that an isolation around −15 dB is secured uniformly in low, intermediate, and high frequency bands, when the fourth radiation conductor 111*d* forms a slot in which the third radiation conductor 111*c* is accommodated (for example, in the configuration illustrated in FIG. 5). It is noted from curve T8, shown in FIG. 15, that the radiation efficiency is further improved in a high frequency band by forming the fourth radiation conductor 111*d* into a slot partially surrounding the third radiation conductor 111*c*.

As described above, the fourth radiation conductor 111*d* may improve isolation between resonant frequency bands according to its arrangement, as well as control a resonant frequency of the antenna device, for example, a resonant frequency in a high frequency band. That is, according to the configuration of the fourth radiation conductor 111*d*, it is possible to operate resonant frequencies of different frequency bands at the same time. Thus, an antenna device suitable for CA may be implemented.

As previously described, the electronic device 100, according to various embodiments of the present disclosure, may form resonant frequencies in different frequency bands (for example, in intermediate and high frequency bands) by arranging the first radiation conductor 111*a* and the second radiation conductor 111*b*, which are a metal part of the case 101, and the third radiation conductor 111*c* and the fourth radiation conductor 111*d*, which are formed into conductor patterns. In addition, since power is separately supplied to the first radiation conductor 111*a* and the second radiation conductor 111*b*, a resonant frequency may be formed even in a low frequency band, which makes it possible to implement an antenna device suitable for CA.

Figure 16:
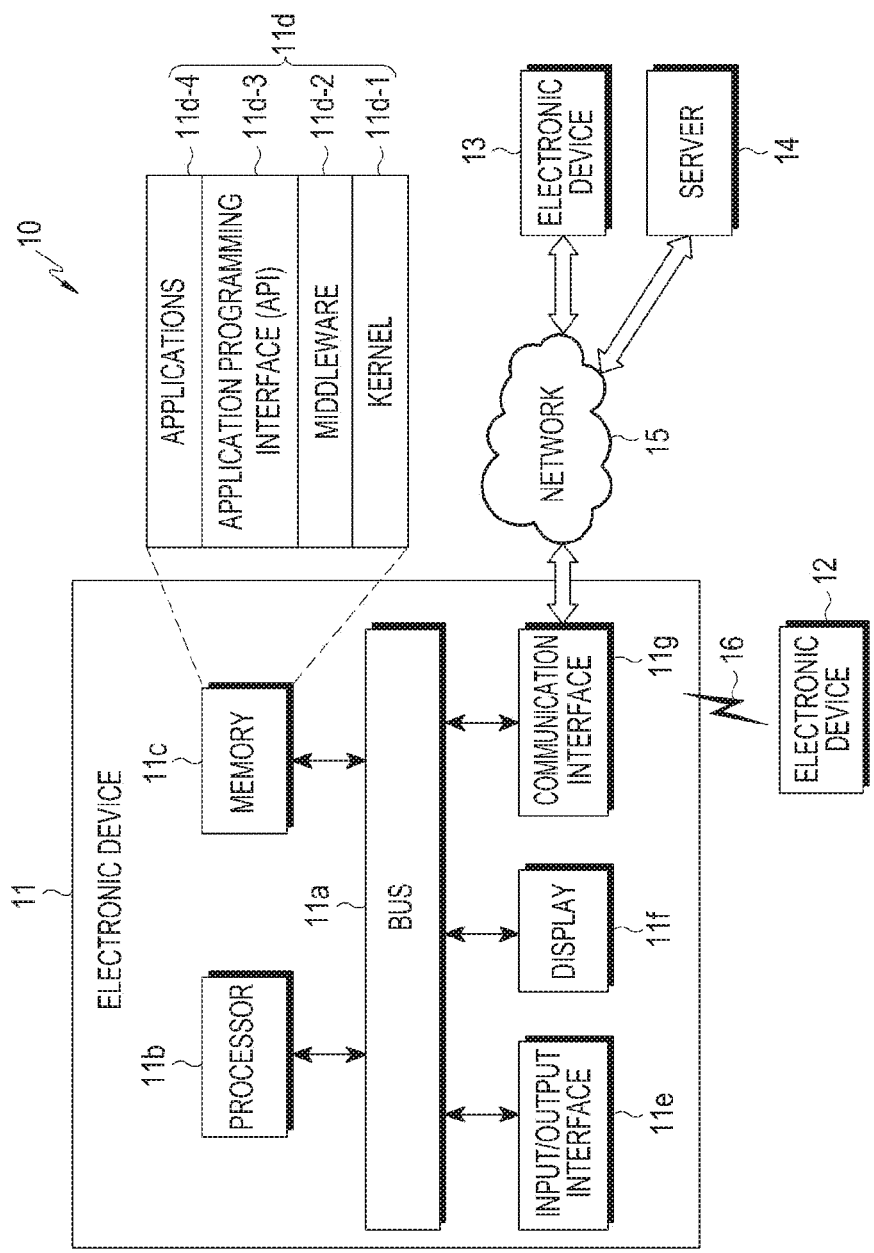
FIG. 16 is a block diagram illustrating a configuration of a network environment including an electronic device, according to an embodiment of the present disclosure.

FIG. 16 is a block diagram illustrating a configuration of a network environment including an electronic device, according to an embodiment of the present disclosure.

Referring to FIG. 16, a network environment 10, including an electronic device 11 (for example, electronic device 100), according to various embodiments of the present disclosure, is provided. The electronic device 11 includes a bus 11*a*, a processor 11*b*, a memory 11*c*, an input/output (I/O) interface 11*e*, a display 11*f*, and a communication interface 11*g*. At least one of the components may be omitted in the electronic device 11 or a component may be added to the electronic device 11.

The bus 11*a* includes a circuit that interconnects the components 11*a* to 11*g* and allows communication (for example, control messages and/or data) between the components 11*a* to 11*g*.

The processor 11*b* includes one or more of a CPU, an AP, and a communication processor (CP). The processor 11*b* executes computation or data processing related to control and/or communication of at least one other component of the electronic device 11.

The memory 11*c* includes a volatile memory and/or a non-volatile memory. The memory 11*c* stores instructions or data related to at least one other component of the electronic device 11. The memory 11*c* may store software and/or programs 11*d*. The programs 11*d* include, for example, a kernel 11*d*-1, middleware 11*d*-2, an application programming interface (API) 11*d*-3, and/or application programs (or applications) 11*d*-4. At least a part of the kernel 11*d*-1, the middleware 11*d*-2, and the API 11*d*-3 may be called an operating system (OS).

The kernel 11*d*-1 controls or manages system resources (for example, the bus 11*a*, the processor 11*b*, or the memory 11*c*) that are used in executing operations or functions implemented in other programs (for example, the middleware 11*d*-2, the API 11*d*-3, or the application programs 11*d*-4). Also, the kernel 11*d*-1 may provide an interface for allowing the middleware 11*d*-2, the API 11*d*-3, or the application programs 11*d*-4 to access, control, or manage individual components of the electronic device 11.

The middleware 11*d*-2 serves as a medium through which the kernel 11*d*-1 communicates with the API 11*d*-3 or the application programs 11*d*-4 to transmit and receive data.

Also, the middleware 11*d*-2 processes one or more task requests received from the application programs 11*d*-4 according to a priority level. For example, the middleware 11*d*-2 assigns a priority level for using system resources (the bus 11*a*, the processor 11*b*, or the memory 11*c*) of the electronic device 11 to at least one of the application programs 11*d*-4. For example, the middleware 11*d*-2 performs scheduling or load balancing for the one or more task requests according to the priority level assigned to the at least one application program 11*d*-4.

The API 11*d*-3 is an interface that controls functions that the application programs 11*d*-4 provides at the kernel 11*d*-1 or the middleware 11*d*-2. For example, the API 11*d*-3 includes at least one interface or function (for example, a command) for file control, window control, video processing, or text control.

The I/O interface 11*e* acts as an interface that provides a command or data received from a user or an external device, such as the first external electronic device 12 or the second external electronic device 13, to the other component(s) of the electronic device 11. Further, the I/O interface 11*e* outputs a command or data received from the other component(s) of the electronic device 11 to the user or the first external electronic device 12 or the second external electronic device 13.

The display 11*f* may include, for example, a liquid crystal display (LCD), a light emitting diode (LED) display, an organic LED (OLED) display, a microelectromechanical systems (MEMS) display, or an electronic paper display. The display 11*f* displays various types of content (for example, text, an image, a video, an icon, or a symbol) to the user. The display 11*f* may include a touch screen and may receive, for example, a touch input, a gesture input, a proximity input, or a hovering input through an electronic pen or a user's body part.

The communication interface 11*g* establishes communication, between the electronic device 11 and the first external electronic device 12, the second external electronic device 13, or a server 14. For example, the communication interface 11*g* may be connected to a network 15 by wireless or wired communication and communicate with the second external electronic device 13 or the server 14 over the network 15.

The wireless communication may be conducted using, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)), as a cellular communication protocol. The wireless communication includes, for example, short-range communication 16. The short-range communication 16 may be conducted by, for example, at least one of WiFi, Bluetooth, NFC, and global navigation satellite system (GNSS). GNSS may include, for example, at least one of global positioning system (GPS), global navigation satellite system (Glonass), Beidou navigation satellite system (Beidou), and Galileo, the European global satellite-based navigation system. In the present disclosure, the terms 'GPS' and 'GNSS' are interchangeably used.

The wired communication may be conducted using, for example, at least one of universal serial bus (USB), high definition multimedia interface (HDMI), recommended standard 232 (RS-232), and plain old telephone service (POTS).

The network 15 is a communication network, for example, at least one of a computer network (for example, LAN or WAN), the Internet, and a telephone network.

The first external electronic device 12 and the second external electronic device 13 may be of the same type as or a different type from the electronic device 11.

The server 14 may include a group of one or more servers.

According to various embodiments of the present disclosure, all or a part of operations performed in the electronic device 11 may be performed in one or more other electronic devices, such as the first external electronic device 12, the second external electronic device 13, or the server 14. Accordingly, if the electronic device 11 is to perform a function or a service automatically or upon request, the electronic device 11 may request at least a part of functions related to the function or the service to the first external electronic device 12, the second external electronic device 13, or the server 14, instead of performing the function or the service autonomously, or additionally. In this case, the first external electronic device 12, the second external electronic device 13, or the server 14 may execute the requested function or an additional function and provide a result of the function execution to the electronic device 11. The electronic device 11 may provide the requested function or service based on the received result or by additionally processing the received result. For this purpose, for example, cloud computing, distributed computing, or client-server computing may be used.

Figure 17:
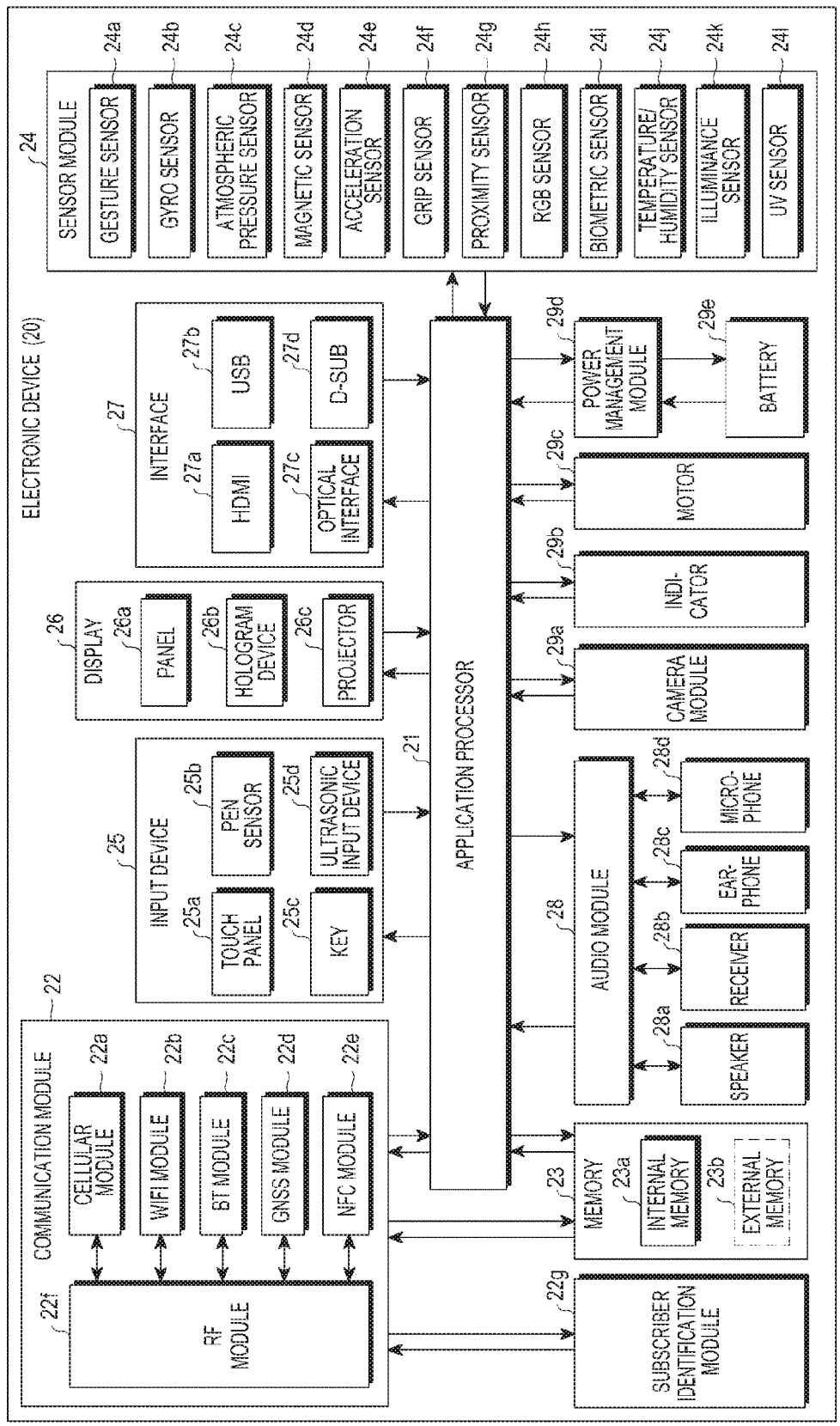
FIG. 17 is a block diagram illustrating a configuration of an electronic device, according to an embodiment of the present disclosure.

FIG. 17 is a block diagram of a configuration an electronic device, according to an embodiment of the present disclosure.

Referring to FIG. 17, an electronic device 20 includes, for example, the whole or part of the electronic device 11 illustrated in FIG. 16, is provided. The electronic device 20 includes at least one processor 21 (for example, AP), a communication module 22, a subscriber identification module (SIM) 22g, a memory 23, a sensor module 24, an input device 25, a display 26, an interface 27, an audio module 28, a camera module 29a, an indicator 29b, a motor 29c, a power management module 29d, and a battery 29e.

The processor 21 controls a plurality of hardware or software components that are connected to the processor 21 by executing an OS or an application program and performs processing or computation on various types of data. The processor 21 may be implemented, for example, as a system on chip (SoC). According to an embodiment of the present invention, the processor 21 may further include a graphic processing unit (GPU) and/or an image signal processor. The processor 21 may include at least a part (for example, a cellular module 22a) of the components illustrated in FIG. 17. The processor 21 loads a command or data received from at least one other component (for example, a non-volatile memory), processes the loaded command or data, and stores various types of data in the non-volatile memory.

The communication module 22 may have the same configuration as or a similar configuration to the communication interface 11g illustrated in FIG. 16. The communication module 22 includes, for example, the cellular module 22a, a WiFi module 22b, a Bluetooth (BT) module 22c, a GNSS module 22d (for example, a GPS module, a Glonass module, a Beidou module, or a Galileo module), an NFC module 22e, and a radio frequency (RF) module 22f. At least a part of the antenna device in the electronic device 100 may be connected to the communication module 22.

The cellular module 22a provides services such as voice call, video call, short message service (SMS), or an Internet service through a communication network. The cellular module 22a identifies and authenticates the electronic device 20 within a communication network, using the SIM 22g. The cellular module 22a may perform at least a part of the functionalities of the processor 21. According to an embodiment of the present disclosure, the cellular module 22a includes a CP.

Each of the WiFi module 22b, the BT module 22c, the GNSS module 22d, and the NFC module 22e may include, for example, a processor for processing data transmitted and received by the module. According to an embodiment of the present disclosure, at least a part of the cellular module 22a, the WiFi module 22b, the BT module 22c, the GNSS module 22d, and the NFC module 22e may be included in a single IC or IC package.

The RF module 22f transmits and receives, communication signals (for example, RF signals). The RF module 22f may include, for example, a transceiver, a power amplifier module (PAM), a frequency filter, a low noise amplifier (LNA), an antenna, etc. According to another embodiment of the present disclosure, at least one of the cellular module 22a, the WiFi module 22b, the BT module 22c, the GNSS module 22d, and the NFC module 22e may transmit and receive RF signals via a separate RF module.

The SIM 22g may be a card and/or an embedded SIM. The SIM 22g includes a unique identifier (for example, integrated circuit card identifier (ICCID)) or subscriber information (for example, international mobile subscriber identity (IMSI)).

The memory 23 (for example, the memory 11c) includes an internal memory 23a and/or an external memory 23b.

The internal memory 23a includes, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state driver (SSD)).

The external memory 23b includes, for example, a flash drive such as a compact flash (CF), a secure digital (SD), a micro secure digital (micro-SD), a mini secure digital (mini-SD), an extreme digital (xD), a multi-media card (MMC), or a memory stick. The external memory 23b may be operatively and/or physically coupled to the electronic device 20 via various interfaces.

The sensor module 24 measures physical quantities or detects operational states associated with the electronic device 20, and converts the measured or detected information into electric signals. The sensor module 24 includes, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor (for example, a red, green, blue (RGB) sensor) 24h, a biometric sensor 24i, a temperature/humidity sensor 24j, an illuminance sensor 24k, and an ultra violet (UV) sensor 24l. Additionally or alternatively, the sensor module 24 may include, for example, an electrical-nose (E-nose) sensor, an electromyography (EMG) sensor, an electroencephaloeram (EEG) sensor, an electrocardiogram (ECG) sensor, an infrared (IR) sensor, an iris sensor, and/or a finger print sensor. The sensor module 24 may further include a control circuit for controlling one or more sensors included therein. According to some embodiments of the present disclosure, the electronic device 20 may further include a processor configured to control the sensor module 24, as a part of or separately from the processor 21. Thus, while the processor 21 is in a sleep state, the control circuit may control the sensor module 24.

The input device 25 includes, for example, a touch panel 25*a*, a (digital) pen sensor 25*b*, a key 25*c*, or an ultrasonic input device 25*d*.

The touch panel 25*a* operates in at least one of, for example, capacitive, resistive, infrared, and ultrasonic schemes. The touch panel 25*a* may include a control circuit. The touch panel 25*a* may further include a tactile layer to thereby provide haptic feedback to the user.

The (digital) pen sensor 25*b* may include, for example, a detection sheet which is a part of the touch panel 25*a* or separately configured from the touch panel 25*a*.

The key 25*c* includes, for example, a physical button, an optical key, or a keypad.

The ultrasonic input device 25*d* identifies data by detecting, using a microphone 28*d*, ultrasonic signals generated from an input tool.

The display 26 (for example, the display 11*f*) includes a panel 26*a*, a hologram device 26*b*, or a projector 26*c*.

The panel 26*a* may have the same configuration as or a similar configuration to the display 11*f* illustrated in FIG. 16. The panel 26*a* may be configured to be, for example, flexible, transparent, or wearable. The panel 26*a* and the touch panel 25*a* may be implemented as a single module.

The hologram device 26*b* uses the interference of light waves to provide a three-dimensional image in the air.

The projector 26*c* provides an image by projecting light on a screen. The screen may be positioned inside or outside the electronic device 20.

According to an embodiment of the present disclosure, the display 26 may further include a control circuit for controlling the panel 26*a*, the hologram device 26*b*, or the projector 26*c*.

The interface 27 includes, for example, an HDMI 27*a*, a USB 27*b*, an optical interface 27*c*, or a D-subminiature (D-sub) 27*d*. The interface 27 may be included, for example, in the communication interface 11*g* illustrated in FIG. 16. Additionally or alternatively, the interface 27 may include, for example, a mobile high-definition link (MHL) interface, an SD/multimedia card (MMC) interface, or an infrared data association (IrDA) interface.

The audio module 28 converts a sound to an electrical signal, and vice versa. At least a part of the components of the audio module 28 may be included, for example, in the I/O interface 11*d*-3 illustrated in FIG. 16. The audio module 28 processes sound information input into, or output from, for example, a speaker 28*a*, a receiver 28*b*, an earphone 28*c*, or the microphone 28*d*.

The camera module 29*a* captures still images and a video. According to an embodiment of the present disclosure, the camera module 29*a* may include one or more image sensors (for example, a front sensor or a rear sensor), a lens, an image signal processor (ISP), or a flash (for example, an LED or a xenon lamp).

The power management module 29*d* manages power of the electronic device 20. According to an embodiment of the present disclosure, the power management module 29*d* may include a power management integrated circuit (PMIC), a charger IC, or a battery gauge. The PMIC may adopt wired and/or wireless charging.

The wireless charging may be performed, for example, in a magnetic resonance scheme, a magnetic induction scheme, or an electromagnetic wave scheme, and may use additional circuits for wireless charging, such as a coil loop, a resonance circuit, or a rectifier.

The battery gauge measures a charge level, a voltage while charging, a current, or a temperature of the battery 29*e*. The battery 29*e* may include, for example, a rechargeable battery and/or a solar battery.

The indicator 29*b* indicates specific states of the electronic device 20 or a part of the electronic device 20 (for example, the processor 21), for example, boot status, message status, or charge status.

The motor 29*c* converts an electrical signal into a mechanical vibration and generates vibrations or a haptic effect.

While not shown, the electronic device 20 may include a processing device for supporting mobile TV (for example, a GPU). The processing device for supporting mobile TV processes media data compliant with, for example, digital multimedia broadcasting (DMB), digital video broadcasting (DVB), or MediaFLO™.

According to various embodiments of the present disclosure, each of the above-described components of the electronic device 20 may include one or more parts and the name of the component may vary with the type of the electronic device. The electronic device 20 may be configured to include at least one of the afore-described components. Some components may be omitted from or added to the electronic device 20. A component may be configured by combining a part of the afore-described components of the electronic device 20, to thereby perform the same functions of the components prior to the combining.

Figure 18:
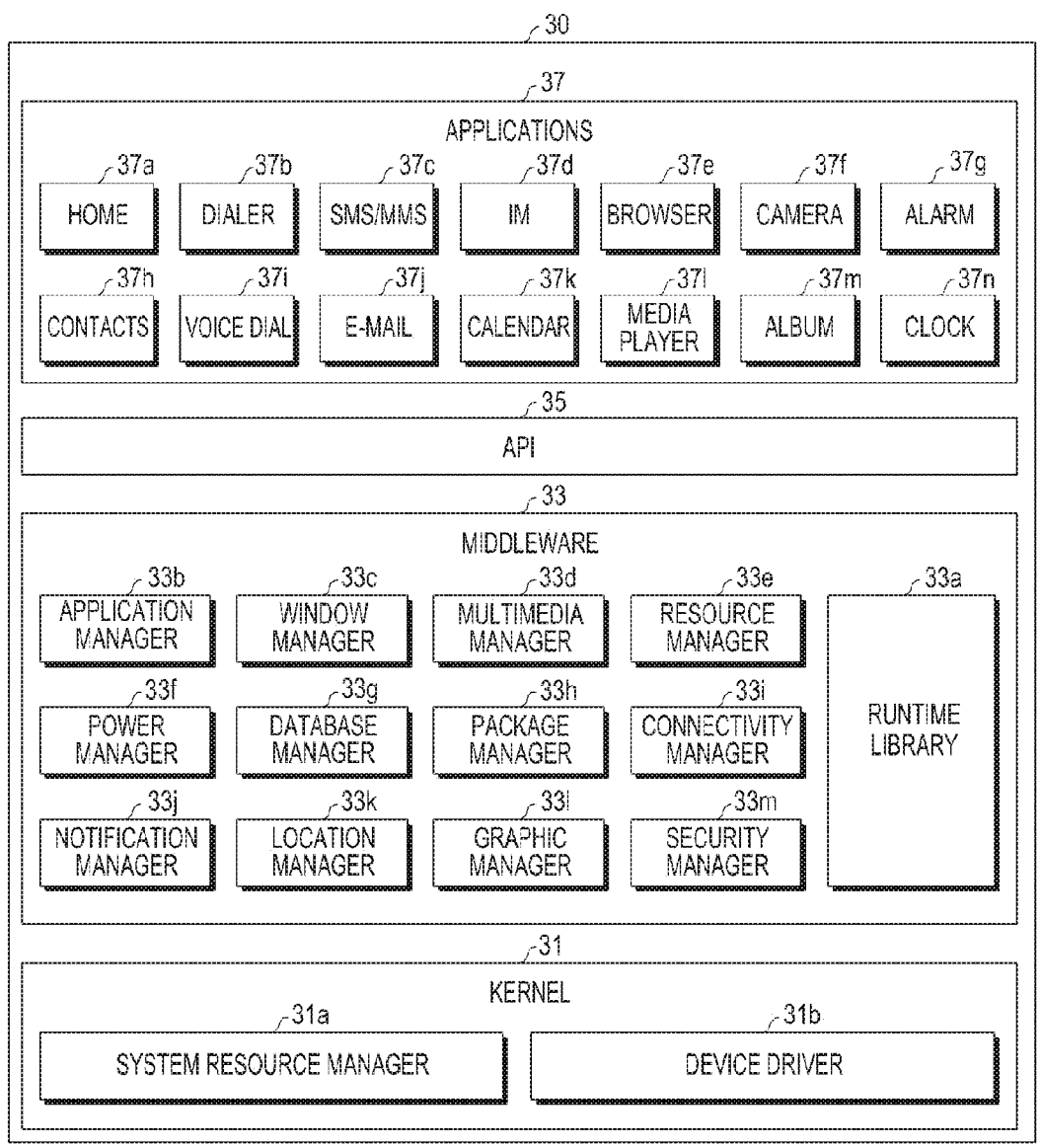
FIG. 18 is a block diagram illustrating a programming module in an electronic device, according to an embodiment of the present disclosure.

FIG. 18 is a block diagram of a programming module in an electronic device, according to an embodiment of the present disclosure.

Referring to FIG. 18, a programming module 30 (for example, the programs 11*d*) is provided. Programming module 30 includes an OS that controls resources related to electronic device 11 and/or various applications executed on the OS (for example, the application programs 11*d*-4). For example, the OS may be Android, iOS, Windows, Symbian, Tizen, Bada, or the like.

The programming module 30 includes a kernel 31, middleware 33, an API 35, and/or applications 37. At least a part of the programming module 30 may be preloaded on the electronic device 11 or downloaded from an external electronic device, for example, the first external electronic device 12, the second external electronic device 13, or the server 14.

The kernel 31 (for example, the kernel 11*d*-1) includes, for example, a system resource manager 31*a* and/or a device driver 31*b*.

The system resource manager 31*a* controls, allocates, or deallocates system resources. According to an embodiment of the present disclosure, the system resource manager 31*a* may include a processor manager, a memory manager, or a file system manager.

The device driver 31*b* includes, for example, a display driver, a camera driver, a Bluetooth driver, a shared memory driver, a USB driver, a keypad driver, a WiFi driver, an audio driver, or an inter-process communication (IPC) driver.

The middleware 33 (for example, the middleware 11*d*-2) provides a function required commonly for the applications 270 or provides various functionalities to the applications 37 through the API 35 so that the applications 37 may efficiently use limited system resources available within the electronic device 11. According to an embodiment of the present disclosure, the middleware 33 may include at least one of a runtime library 33a, an application manager 33b, a window manager 33c, a multimedia manager 33d, a resource manager 33e, a power manager 33f, a database manager 33g, a package manager 33h, a connectivity manager 33i, a notification manager 33j, a location manager 33k, a graphic manager 33l, or a security manager 33m.

The runtime library 33a includes a library module that a complier uses to add a new function in a programming language during execution of an application 37. The runtime library 33a performs input/output management, memory management, a function related to arithmetic function, or the like.

The application manager 33b manages the life cycle of at least one of the applications 37.

The window manager 33c manages GUI resources used for a screen.

The multimedia manager 33d determines formats required to play back various media files and encodes or decodes a media file using a CODEC suitable for the format of the media file.

The resource manager 33e manages resources, such as a source code of at least one application, a memory, or storage space.

The power manager 33f manages a battery or a power source by operating in conjunction with a basic input/output system (BIOS) and provides power information required for an operation of the electronic device 11.

The database manager 33g manages a database for at least one of the applications 37 so that the database may be generated, searched, or modified.

The package manager 33h manages installation or update of an application distributed as a package file.

The connectivity manager 33i manages wireless connectivity of WiFi, Bluetooth, etc.

The notification manager 33j indicates or notifies of an event, such as message arrival, a schedule, a proximity alarm, etc., in a manner that does not bother a user.

The location manager 33k manages location information about the electronic device 11.

The graphic manager 33l manages graphical effects to be provided to the user or related user interfaces.

The security manager 33m provides an overall security function required for system security, user authentication, etc.

In an embodiment of the present disclosure, if the electronic device 11 has a telephony function, the middleware 33 may further include a telephony manager to manage a voice or video call function of the electronic device 11.

A new middleware module may be created and used by combining various functions of the above-described component modules in the middleware 33. The middleware 33 may provide a customized module for each OS type in order to provide differentiated functions. In addition, the middleware 33 may dynamically delete a part of the existing components or add a new component.

The API 35 (for example, the API 11d-3) is a set of API programming functions, which may be configured differently according to an OS. For example, in the case of Android or iOS, one API set may be provided per platform, whereas in the case of Tizen, two or more API sets may be provided per platform.

The applications 37 (for example, the application programs 11d-4) includes one or more applications capable of providing functions, such as home 37a, dialer 37b, short message service/multimedia messaging service (SMS/MMS) 37c, instant message (IM) 37d, browser 37e, camera 37f, alarm 37g, contacts 37h, voice dial 37i, e-mail 37j, calendar 37k, media player 37l, album 37m, or clock 37n, health care (for example, measurement of an exercise amount or a glucose level), or providing of environment information (for example, information about atmospheric pressure, humidity, or temperature).

According to an embodiment of the present disclosure, the applications 37 may include an information exchange application supporting information exchange between the electronic device 11 and an external electronic device, such as the first external electronic device 12 or the second external electronic device 13. The information exchange application may include a notification relay application for transmitting specific information to the external electronic device or a device management application for managing the external electronic device.

The notification relay application includes a function of transmitting notification information generated from another application (for example, an SMS/MMS application, an email application, a health care application, or an environment information application) to the first external electronic device 12 or the second external electronic device 13. Also, the notification relay application may receive notification information from the first external electronic device 12 or the second external electronic device 13 and transmit the received notification information to a user.

The device management application manages (for example, installs, deletes, or updates) at least a part of functions of the first external electronic device 12 or the second external electronic device 13 communicating with the electronic device 11 (for example, turn-on/turn-off of the external electronic device (or a part of its components) or control of the brightness (or resolution) of the display), an application executed in the first external electronic device 12 or the second external electronic device 13, or a service (for example, a call service or a message service) provided by the first external electronic device 12 or the second external electronic device 13.

According to an embodiment of the present disclosure, the applications 37 may include an application (for example, a health care application) designated according to a property (for example, the type of the electronic device, e.g., mobile medical device) of the first external electronic device 12 or the second external electronic device 13. The applications 37 may additionally include an application received from the first external electronic device 12, the second external electronic device 13, or the server 14. The applications 37 may further include a preloaded application or a third party application downloadable from the server 14. The names of components of the programming module 30 according to embodiment of the present disclosure may vary according to the type of an OS.

According to various embodiments, at least a part of the programming module 30 may be implemented in software, firmware, hardware, or a combination of them. At least a part of the programming module 30 may be implemented (for example, executed) by the processor (for example, the processor 21). At least a part of the programming module 30 may include, for example, a module, a program, a routine, a set of instructions, or a process to execute one or more functions.

The term "module" as used herein may include its ordinary meaning including, for example, a unit of one, or a combination of hardware, software, and firmware. The term "module" may be used interchangeably with terms such as unit, logic, logical block, component or circuit. A "module"

may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the processor 11b), one or more processors may execute functions corresponding to the commands. The computer-readable storage medium may be, for example, the memory 11c.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), etc. Program instructions may include machine language code that are produced by a compiler or high-level language code that may be executed by a computer using an interpreter. The functionalities of hardware discussed above may be implemented as one or more software modules, and vice versa in order to perform an operation according to various embodiments of the present disclosure.

A module or a programming module, according to various embodiments of the present disclosure, may include one or more of the above-described components, may omit a portion thereof, or may include additional components. Operations that are performed by a module, a programming module, or other components may be processed in a serial, parallel, repetitive or heuristic manner. Also, some operations may be performed in a different order or omitted, or additional operations may be added.

According to various embodiments of the present disclosure, an electronic device 100 includes a front cover 102 forming a front surface of the portable electronic device, a rear cover 103 forming a rear surface of the portable electronic device, a conductive sidewall including the second radiation conductor 111b (for example, the frame 101b) surrounding at least a part of a space formed between the front cover and the rear cover, and including a first part (for example, the first radiation conductor 111a) surrounding a corner of the portable electronic device and a second part extended in a first direction in which one side surface of the case 102 is extended, isolated from the first part, a display device 121 including a screen area in the space, exposed through the front cover, a non-conductive structure (for example, the case member 101a) disposed in the vicinity of the conductive sidewall or contacting the conductive sidewall in the space, and including a first surface (for example, the inner surface of the case member 101a) facing the front cover and a second surface (for example, the outer surface of the case member 101a) facing the rear cover, a first antenna pattern (for example, the third radiation conductor 111c) electrically connected to the first part, and including a first area (for example, at least a part of the third radiation conductor 111c) overlapping with the non-conductive structure, when seen from above the non-conductive structure, and extended in the first direction, a second antenna pattern (for example, the fourth radiation conductor 111d) including a second area (for example, a part of the fourth radiation conductor 111d) overlapping with the non-conductive structure, when seen from above the non-conductive structure, and extended substantially in the first direction between the second part and the first area; and one or more IC chips 141 electrically connected to at least one of the first antenna pattern and the second antenna pattern.

The second antenna pattern may further include a third area (for example, another part of the fourth radiation conductor 111d) overlapping with the non-conductive structure, when seen from above the non-conductive structure, and surrounding at least a part of the first antenna pattern, together with the second area.

The at least a part of the third area may be extended substantially in the first direction.

The third area may be electrically connected to the first part of the sidewall.

The electronic device may further include a flexible conductive connector (for example, the connection terminals 165) electrically connected to at least one of the first part, the second part, the first antenna pattern, and the second antenna pattern. The first antenna pattern or the second antenna pattern may be extended on a part of the first surface of the non-conductive structure or a part of the second surface of the non-conductive structure.

The flexible conductive connector may contain the same metal material as the conductive sidewall.

The first antenna pattern or the second antenna pattern may be extended on a part of the first surface of the non-conductive structure, and the flexible conductive connector may be electrically connected to at least one of the first and second parts on the second surface of the non-conductive structure.

The first antenna pattern or the second antenna pattern may be extended on a part of the second surface of the non-conductive structure, and the flexible conductive connector may be electrically connected, on the second surface of the non-conductive structure, to at least one of the first part, the second part, the first antenna pattern, and the second antenna pattern extended on the second surface of the non-conductive structure.

The electronic device may further include a via hole 111f penetrating from the first surface to the second surface, and at least one third part (for example, the engagement pieces 113, 113a, 113b, and 113c) extended from at least one of the first part and the second part.

The least a part of the at least one third part may be positioned on the via hole, and the flexible conductive connector may electrically contact the at least one third part.

The non-conductive structure may contact the at least one third part.

The non-conductive structure may contain a polymer material.

As is apparent from the foregoing description, an electronic device according to various embodiments of the present disclosure includes a case (for example, a case member and a frame) which is at least partially formed of a metal material, thus rendering the exterior of the electronic device to be sophisticated. Resonant frequencies may be formed in different frequency bands, using a part of the case, and thus a mounting space for an antenna device may be readily secured. Accordingly, since the electronic device, according to various embodiments of the present disclosure, includes an antenna device which renders the outward looks of the electronic device to be sophisticated and is suitable for CA, ultra-high-speed, large-capacity wireless communication may be implemented. Further, third and fourth radiation conductors of the antenna device may be configured as conductive patterns disposed on a surface of the case (for example, the inner or outer surface of the case). As the third and fourth radiation conductors may be designed freely in shape and layout, an antenna device having required performance and its installation space may be readily secured.

The embodiments disclosed herein are provided for description and understanding of the present disclosure, and are not intended to limit the scope of the present disclosure. Accordingly, the scope of the present disclosure should be interpreted as embracing all modifications or various embodiments within the scope of the present disclosure therein. Accordingly, the scope of the present disclosure is defined, not by the detailed description and embodiments, but by the following claims and their equivalents.

What is claimed is:

1. An electronic device comprising:
a case member;
a frame disposed around a periphery of one surface of the case member, forming sidewalls; and
an antenna device for transmitting and receiving wireless signals,
wherein the antenna device comprises:
a first radiation conductor forming a first part of the frame;
a second radiation conductor disposed in a vicinity of the first radiation conductor, forming a second part of the frame;
a third radiation conductor provided on the case member and connected to a first power supply of the electronic device, together with the first radiation conductor; and
a fourth radiation conductor provided on the case member and connected to a ground of the electronic device,
wherein at least a part of the fourth radiation conductor is disposed in a vicinity of the second radiation conductor.

2. The electronic device of claim 1, wherein the frame at least partially contains a metal material,
the case member at least partially contains a synthetic resin material and is integrated with the frame by insert injection molding.

3. The electronic device of claim 1, further comprising a second power supply for supplying power to the second radiation conductor.

4. The electronic device of claim 1, wherein the first radiation conductor is connected at a first point to the first power supply, together with the third radiation conductor and connected at a second point to the ground.

5. The electronic device of claim 4, wherein the third radiation conductor extends in parallel with the second radiation conductor or in an inclined direction with respect to the second radiation conductor from the first point.

6. The electronic device of claim 4, wherein the fourth radiation conductor extends to surround at least a part of an area in which the third radiation conductor is disposed, the fourth radiation conductor comprising:
a first end connected to the second point; and
a second end connected to the ground, in an area between the second radiation conductor and the third radiation conductor.

7. The electronic device of claim 1, further comprising a circuit board facing an inner surface of the case member,
wherein the first radiation conductor is connected to at least one of the first power supply and the ground through the circuit board.

8. The electronic device of claim 7, further comprising a plurality of connection terminals on the circuit board,
wherein a first connection terminal and a second connection terminal of the plurality of connection terminals contact a first point and a second point, respectively, of the first radiation conductor.

9. The electronic device of claim 8, wherein the first connection terminal is connected to the first power supply, and
the second connection terminal is connected to the ground.

10. The electronic device of claim 8, further comprising at least one connection piece extended from the first radiation conductor,
wherein at least one of the first connection terminal and the second connection terminal is electrically connected to the first radiation conductor through the at least one connection piece.

11. The electronic device of claim 10, further comprising an engagement hole formed between a first connection piece and a second connection piece of the at least one connection piece, wherein the first connection piece and the second connection piece are formed, respectively, at the first point and the second point of the first radiation conductor.

12. The electronic device of claim 8, further comprising a via hole formed on the case member,
wherein the second connection terminal is connected to the ground and connected to the fourth radiation conductor through the via hole.

13. The electronic device of claim 12, further comprising a conductor in the via hole.

14. The electronic device of claim 1, wherein the third radiation conductor and the fourth radiation conductor are formed into conductive patterns formed on at least one of a front surface and a rear surface of the case member.

15. The electronic device of claim 1, wherein the first radiation conductor is disposed at a corner of the electronic device.

16. The electronic device of claim 15, wherein the second radiation conductor is disposed in a vicinity of the corner at which the first radiation conductor is disposed, isolated from the first radiation conductor.

17. A portable electronic device comprising:
a front cover forming a front surface of the portable electronic device;
a rear cover forming a rear surface of the portable electronic device;
a conductive sidewall surrounding at least a part of a space formed between the front cover and the rear cover, and including a first part surrounding a corner of the portable electronic device and a second part extended in a first direction, isolated from the first part;
a display device disposed in the space and including a screen area exposed through the front cover;
a non-conductive structure disposed in a vicinity of the conductive sidewall or contacting the conductive sidewall in the space, and including a first surface facing the front cover and a second surface facing the rear cover;
a first antenna pattern electrically connected to the first part, and including a first area overlapping with the non-conductive structure, the first area extended in the first direction;

a second antenna pattern including a second area overlapping with the non-conductive structure, the second area extended substantially in the first direction between the second part and the first area; and one or more integrated circuit chips electrically connected to at least one of the first antenna pattern and the second antenna pattern, wherein at least a part of the second antenna pattern is disposed in a vicinity of the second part.

18. The portable electronic device of claim 17, wherein the second antenna pattern further includes a third area overlapping with the non-conductive structure, the third area surrounds at least a part of the first antenna pattern, together with the second area.

19. The portable electronic device of claim 18, wherein at least a part of the third area is extended substantially in the first direction.

20. The portable electronic device of claim 18, wherein the third area is electrically connected to the first part of the sidewall.

21. The portable electronic device of claim 17, further comprising a flexible conductive connector electrically connected to at least one of the first part, the second part, the first antenna pattern, and the second antenna pattern, wherein at least one of the first antenna pattern and the second antenna pattern is extended on at least one of a part of the first surface of the non-conductive structure and a part of the second surface of the non-conductive structure.

22. The portable electronic device of claim 21, wherein the flexible conductive connector contains a same metal material as the conductive sidewall.

23. The portable electronic device of claim 21, wherein at least one of the first antenna pattern and the second antenna pattern is extended on a part of the first surface of the non-conductive structure, and the flexible conductive connector is electrically connected to at least one of the first part and the second part on the second surface of the non-conductive structure.

24. The portable electronic device of claim 21, wherein at least one of the first antenna pattern and the second antenna pattern is extended on a part of the second surface of the non-conductive structure, and wherein the flexible conductive connector is electrically connected, on the second surface of the non-conductive structure, to at least one of the first part, the second part, the first antenna pattern, and second antenna pattern extended on the second surface of the non-conductive structure.

25. The portable electronic device of claim 21, further comprising:

a via hole penetrating from the first surface to the second surface; and at least one third part extended from at least one of the first part and the second part.

26. The portable electronic device of claim 25, wherein at least a part of the at least one third part is positioned on the via hole, and the flexible conductive connector electrically contacts the at least one third part.

27. The portable electronic device of claim 26, wherein the non-conductive structure contacts the at least one third part.

28. The portable electronic device of claim 17, wherein the non-conductive structure contains a polymer material.

* * * * *